United States Patent
Swarny et al.

(10) Patent No.: US 9,057,461 B2
(45) Date of Patent: Jun. 16, 2015

(54) HELICALLY WOUND METAL PIPE WITH SEALING ARRANGEMENT

(75) Inventors: Mark J. Swarny, Buena Vista, CO (US); Daniel W. Aberle, Portland, OR (US); Gregory W. Byrne, Jr., West Linn, OR (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 650 days.

(21) Appl. No.: 13/419,047

(22) Filed: Mar. 13, 2012

(65) Prior Publication Data

US 2013/0240070 A1 Sep. 19, 2013

(51) Int. Cl.
*F16L 11/16* (2006.01)
*F16L 9/16* (2006.01)
*E03B 3/02* (2006.01)

(52) U.S. Cl.
CPC ... *F16L 9/165* (2013.01); *E03B 3/02* (2013.01)

(58) Field of Classification Search
USPC .............. 138/164, 154, 145, 146, 173; 72/46; 29/458, 460, 527.1; 285/424
See application file for complete search history.

(56) References Cited

U.S. PATENT DOCUMENTS

| | | | | |
|---|---|---|---|---|
| 1,906,010 A | * | 4/1933 | Naylor | 138/154 |
| 3,419,183 A | * | 12/1968 | Khoury | 220/689 |
| 3,572,394 A | * | 3/1971 | Davis | 138/154 |
| 3,865,146 A | * | 2/1975 | Meserole | 138/154 |
| 4,121,624 A | * | 10/1978 | Chen | 138/122 |
| 4,481,978 A | * | 11/1984 | Escandell | 138/122 |
| 4,661,417 A | * | 4/1987 | Suzuki et al. | 428/607 |
| 4,903,996 A | | 2/1990 | Herr | |
| 5,158,115 A | * | 10/1992 | Miller | 138/154 |
| 5,316,606 A | * | 5/1994 | Andre | 156/201 |
| 5,415,440 A | | 5/1995 | Kanao | |
| 6,053,212 A | * | 4/2000 | Thomas | 138/129 |
| 6,427,727 B1 | * | 8/2002 | Thomas | 138/106 |
| 7,574,886 B2 | | 8/2009 | Zepp et al. | |
| 2002/0043806 A1 | | 4/2002 | Neumaier et al. | |

FOREIGN PATENT DOCUMENTS

| | | |
|---|---|---|
| CN | 201032004 | 3/2008 |
| CN | 201535414 | 7/2010 |
| JP | 01276292 | 7/1990 |
| JP | 2000074278 | 3/2000 |
| KR | 1020100083682 | 7/2010 |

* cited by examiner

*Primary Examiner* — Patrick F Brinson
(74) *Attorney, Agent, or Firm* — Thompson Hine LLP

(57) ABSTRACT

A pipe includes a tubular pipe formed of a metal sheet that is spirally wound such that opposite edges of the metal sheet are joined by a crimped lock seam that extends helically along a length of the tubular pipe. A sealing arrangement includes a helically extending worked surface band extending along the crimped lock seam and to both sides of the crimped lock seam, the worked surface band having a surface roughness that is greater than a surface roughness of unworked surface portions outside of the worked surface band. A helically extending external coating band is applied over the crimped lock seam and bonded to the worked surface band.

23 Claims, 7 Drawing Sheets ated metal pipe is well known. Elongated metal sheet strip
HELICALLY WOUND METAL PIPE WITH SEALING ARRANGEMENT

TECHNICAL FIELD

This application relates to metal pipes formed by helically winding metal sheet material into a tubular pipe and seaming abutting edges and, more particularly, to a sealing arrangement for such helically wound metal pipe.

BACKGROUND

The standard production process for producing helically wound metal pipe is well known. Elongated metal sheet strip material is spiraled into a helical form so that opposite edges of the strip come together and can be crimped to form a helical lock along the pipe. In some cases, the metal sheet strip may be flat when spiraled. In other cases, lengthwise extending corrugations, ribs and/or channels may be formed in the elongated metal sheet prior to spiraling for increasing the strength of the pipe. One example of a platform mill for producing such helical pipe is shown in U.S. Pat. No. 7,404,308.

In some applications it is desirable for the resulting pipe to be sealed. Welded locks are sometimes used for this purpose, but such welding tends to increase cost. It is also known to provide liners in the resulting pipe, which can again be costly.

It would be desirable to provide a helically wound pipe with helical lock and an associated sealing arrangement that is cost-effective.

SUMMARY

In one aspect, a pipe includes a tubular pipe formed of a metal sheet that is spirally wound such that opposite edges of the metal sheet are joined by a crimped lock seam that extends helically along a length of the tubular pipe. A sealing arrangement includes a helically extending worked surface band extending along the crimped lock seam and to both sides of the crimped lock seam, the worked surface band having a surface roughness that is greater than a surface roughness of unworked surface portions outside of the worked surface band. A helically extending external coating band is applied over the crimped lock seam and bonded to the worked surface band.

In one implementation of the above pipe, the coating band includes an interior band segment that overlies the crimped lock seam and that is bounded by first and second side band segments, wherein an average thickness of the interior band segment is at least twice the average thickness of the first and second side band segments.

In another aspect, a method of manufacturing a pipe involves: spiraling an elongated metal sheet strip material into a helical form so that opposite edges of the strip come together to create a tubular pipe form; crimping the opposite edged of the strip to form a helical lock seam that extends along the tubular pipe form; working an external surface of the tubular pipe form along the helical lock seam and to the sides of the helical lock seam to form a helically extending worked surface band having a surface roughness that is greater than a surface roughness of unworked surface portions outside of the worked surface band; and applying an external coating material over the helical lock seam and bonded to the worked surface band to form a helically extending coating material band.

DETAILED DESCRIPTION

Figure 1:
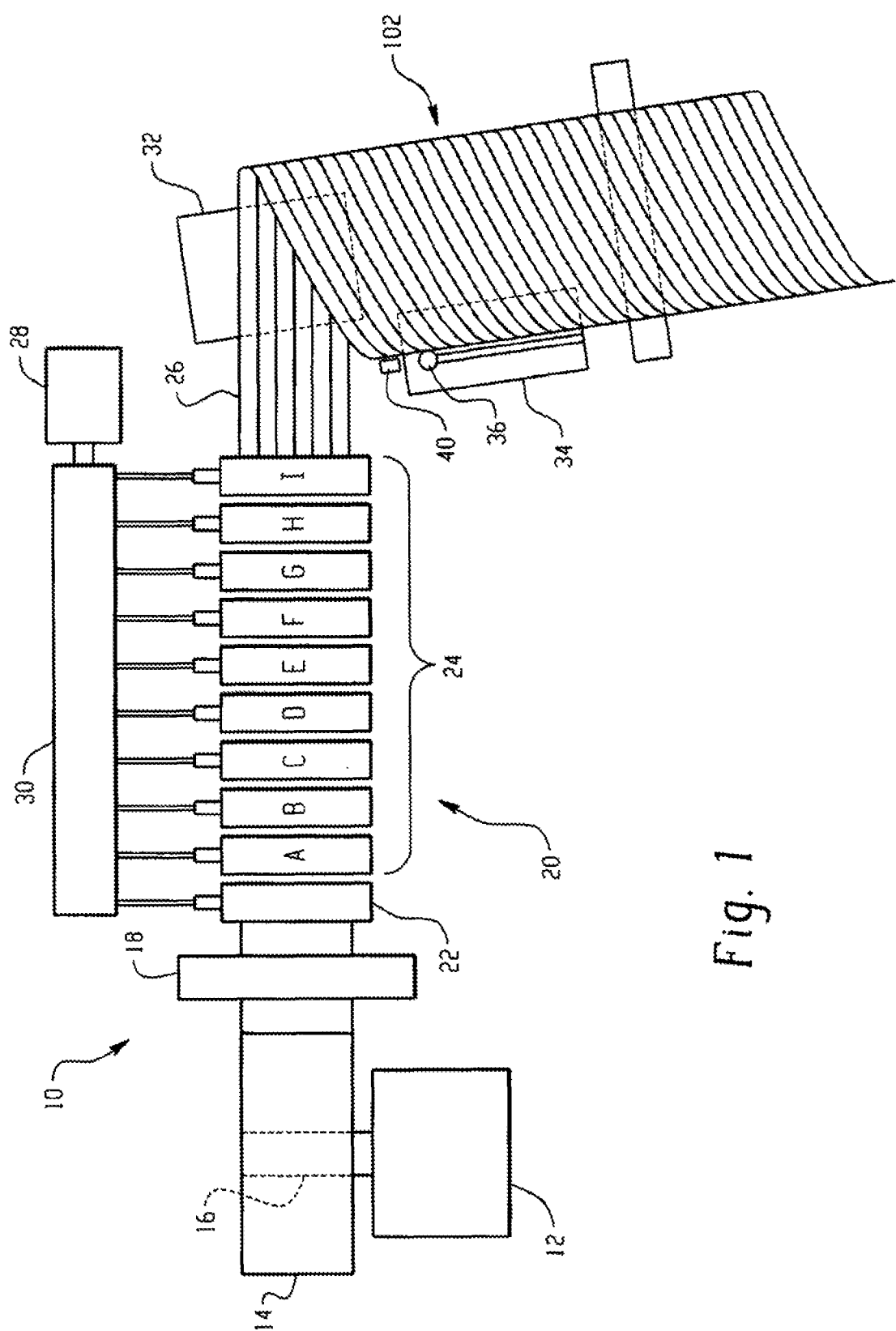
FIG. 1. is a plan view of a pipe production mill.

Referring to FIG. 1, an exemplary pipe production mill 10 is shown in top plan schematic form. The mill 10 includes a decoiler unit 12 for receiving a coil 14 formed by a rolled metal sheet (which may or may not include an aluminized coating, a galvanized coating or a polymeric coating). The illustrated decoiler unit 12 supports the coil 14 on a rotatable expansion mandrel 16, permitting the coil to rotate during pipe manufacture. A weld table 18 is shown downstream of the decoiler unit 12 and is provided for welding the end of one metal sheet to the end of the metal sheet of a different coil upon coil replacement. A corrugating line 20 feeds the sheet through a number of tooling stands 24 (A thru I) that form corrugations in the metal sheet to produce a corrugated metal strip 26. The metal sheet passes between upper and lower tooling structures in each of the stands 24 to form corrugations. The exact configuration of the corrugations formed in the metal sheet can vary (e.g., from sinusoidal corrugations to box-shaped corrugations). The tooling stands also form lips along the edges of the metal sheet to facilitate production of the helical lock seam described below. The exact configuration of locking lips can vary. As will be appreciated, in some implementations of such a pipe mill (e.g., where a smooth wall metal pipe is desired) the metal sheet may maintain is flat configuration.

The rotational tooling of the illustrated tooling stands may be driven by an electric motor 28 with its output linked to a gearbox/transmission arrangement 30. Multiple motors and gearboxes could also be provided. A forming head 32 is positioned to receive the corrugated metal strip 26 (or in some cases flat strip) and includes a lock seam forming mechanism (not shown). The forming head 32 may be a well known three-roll forming head configured to spiral the corrugated metal strip 26 back upon itself as shown. The lock seam mechanism locks adjacent edges of the spiraled corrugated metal strip in a crimped manner to produce a helical lock seam 100 (FIG. 2) in the resulting pipe form 102. Specifically, as the corrugated metal strip is helically curved back upon itself to form the pipe-shape, the locking lips come together before passing into the lock seam mechanism, and the lock seam mechanism presses the lips together to produce a lock seam.

A saw unit 34 is positioned along the pipe exit path and includes a saw 36 that is movable into and out of engagement with the pipe 102 and that is also movable along a path parallel to the pipe exit path so that the pipe can be cut even while pipe continues to be produced. Pipes with a variety of diameters can be formed by the device 10, and large scale diameter control is made by adjusting an entry angle of the corrugated metal strip 24 to the forming head 32. Such angle adjustment can be achieved by either by rotating the forming head 32 relative to a stationary corrugation line 20 or by rotating the corrugation line 20, weld table 18 and decoiler unit 12 relative to a stationary forming head 32.

Figure 2:
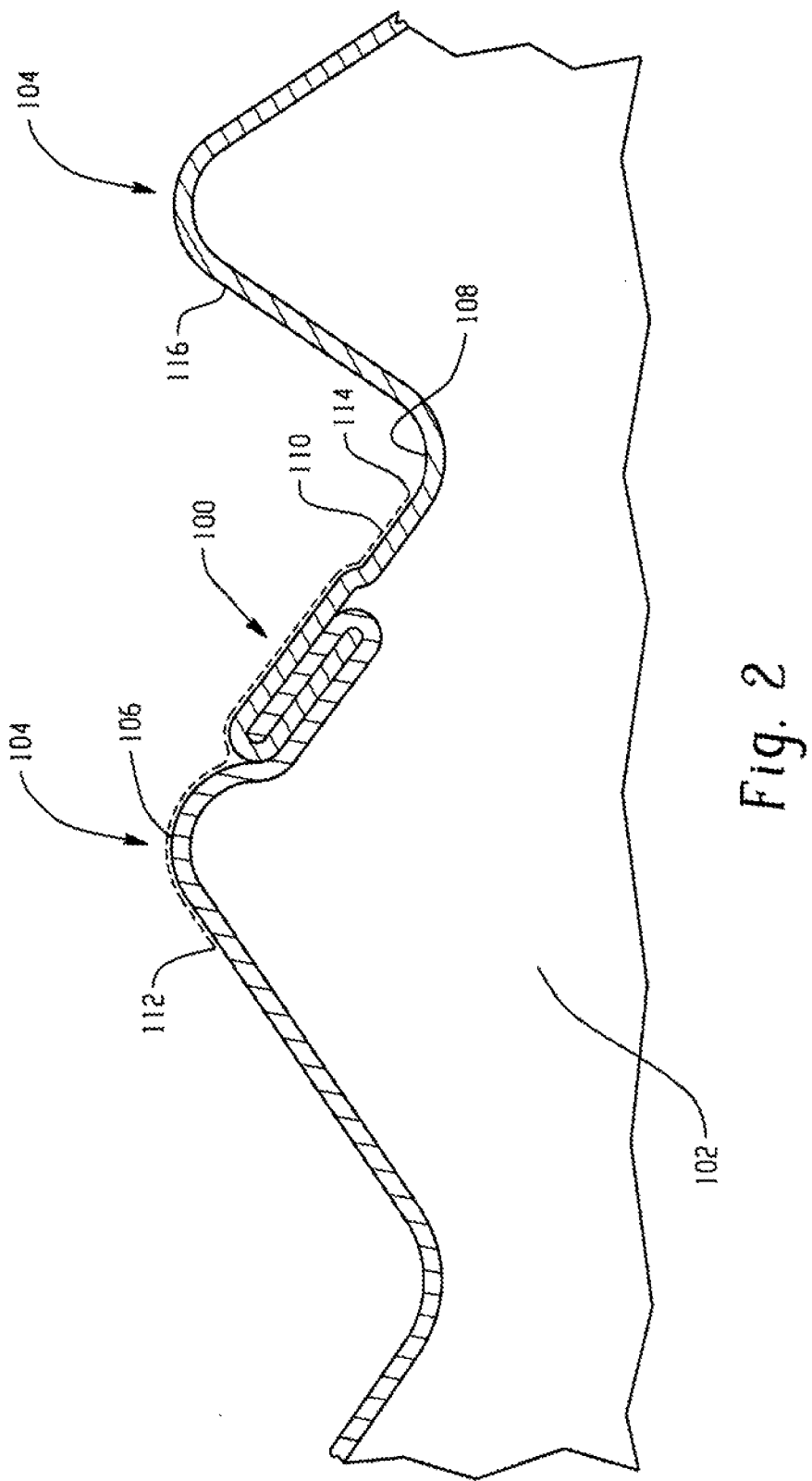
FIG. 2 is a partial cross-section of an exemplary pipe.

Referring now to FIG. 2, where a partial cross-section of one possible embodiment of the pipe form 102 is shown, it is seen that the metal sheet used to create the pipe is corrugated, resulting in helically extending corrugations 104 along the pipe and a helically extending crimped lock seam 100 along the pipe. In the illustrated embodiment, the lock seam 100 is located along a transition from corrugation crest 106 to corrugation valley 108, but other locations for lock seam are possible.

In order to produce a sealed pipe structure, a worked surface band 110 is produced on the exterior of the pipe in the vicinity of the lock seam 100, in this case extending from surface location 112 to surface location 114, resulting in a helically extending worked surface band 110 extending along the crimped lock seam 100 and to both sides of the crimped lock seam. The worked surface band may be produced by mechanical etching, machining or other suitable technique. In one embodiment, the worked surface band is produced by using a right angle grinding wheel (e.g., an abrasive brush wheel) that is manually applied along the lock seam 100 after a length of pipe has been cut and moved from the mill. However, it is possible that such manual application could occur at a station along the output side of the mill of FIG. 1 before the length of pipe is cut. Moreover, one or more automated machining stations (e.g., 40 in FIG. 1) could be established for this purpose.

Regardless of how the working of the surface is implemented, the key is to prepare the surface to receive an elastomeric coating by creating a suitable surface roughness to which the elastomeric coating can properly adhere. In one embodiment, the resulting worked surface band has an average surface roughness of at least 3 MILS (e.g. at least 4 MILS or between 3 and 8 MILS) as measured using a surface profile gauge. In order to assure desired surface roughness, in one implementation after the band is etched a testing operation may be carried out using the measurement tool. If the average surface roughness does not meet the defined specification, further etching is carried out. In any event, the surface roughness of the worked surface band 110 is greater than a surface roughness of unworked surface portions (e.g., 116) that are outside of the worked surface band 110.

Figure 3A:
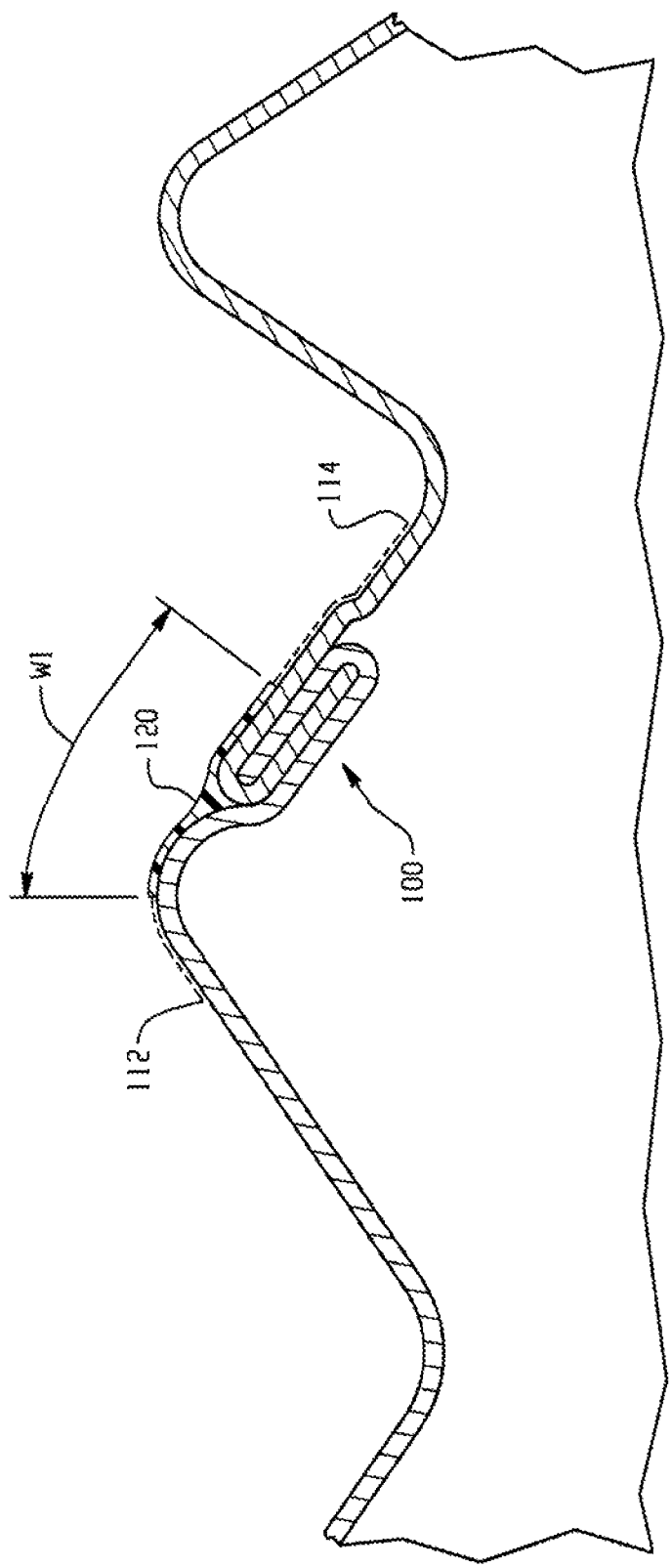
FIG. 3A shows the pipe of FIG. 2 with a first layer of elastomeric coating applied over the lock seam.
Figure 3B:
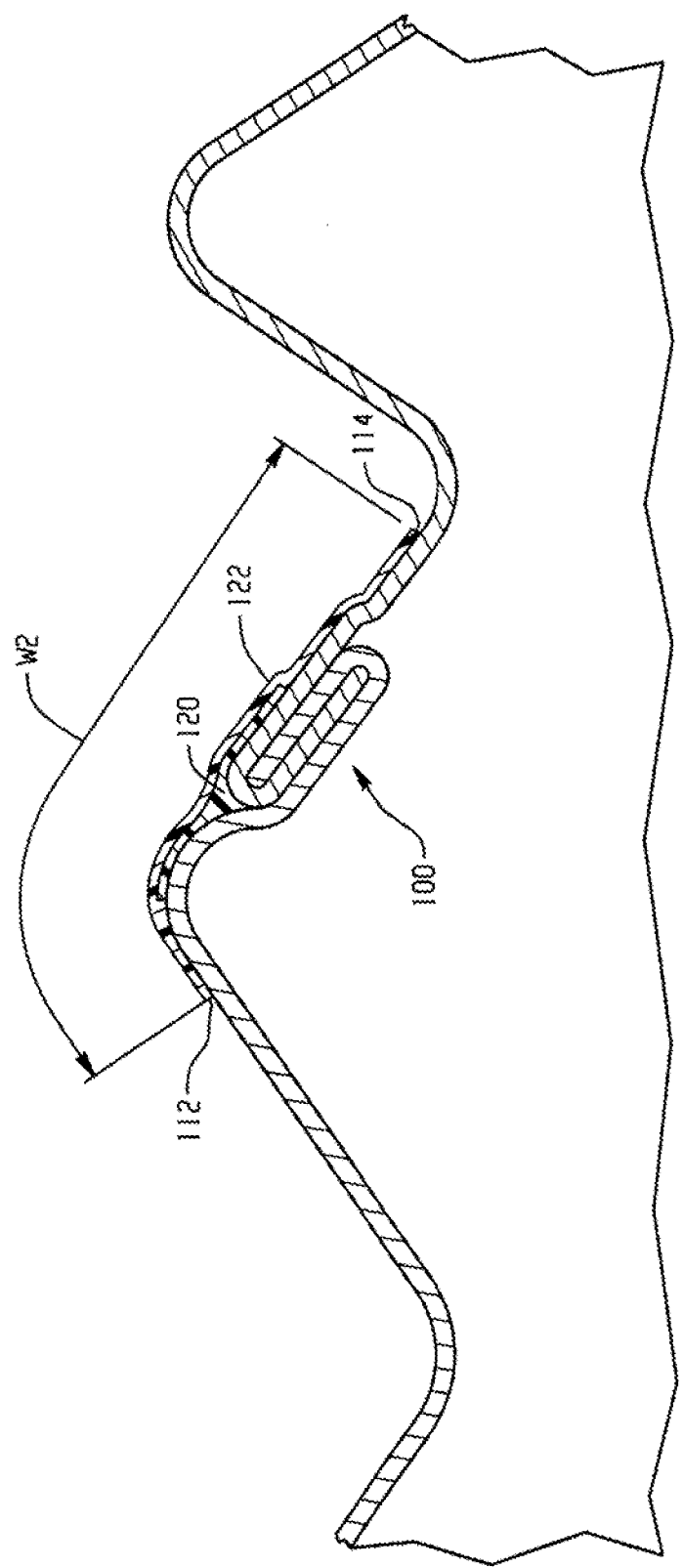
FIG. 3B shows the pipe of FIG. 3A with a second layer of elastomeric coating applied.

Once the worked surface band 110 is successfully achieved, the pipe is ready to receive the elastomeric coating band. In one implementation, the elastomeric coating band is a material applied using a plural component spray process and is applied in two layers. For example, a bonded monolithic polymer seal (BMPS) material may be used, made up of a plural component system consisting of an "isocyanate" (also known as a diisocyanate with other variations that may include: isophorone diisocyanate, methylene diphenyl diisocyanate, toluene diisocyanate or hexamethylene diisocyanate) and mixed with one or more of the following: an alcohol, an hydroxyl, a polyol, or an amine, creating a "polyurethane or polyurea" compound. An example of this material is Custom Linings 911 pure polyurea, available from Custom Linings, Inc. of Beuna Vista, Colo., but there are products that may be used. Referring to FIG. 3A, a first layer 120 of the coating is sprayed directly over the lock seam 100. By way of example, this layer may be applied with a width W1 of about one to three inches, but should generally be wide enough to extend at least slightly beyond the lock seam 100 as shown. The first layer adheres or bonds to the worked surface band 110. A second layer 122 (FIG. 3B) is then applied over the first layer 124 and with a width W2 that is larger than width W1. The resulting configuration is that the a middle portion of the second layer 122 is bonded to the first layer 120 and side portions of the second layer 122 are bonded, at least in part, to the worked surface band 110. Preferably, the side portions of the second layer 222 fully cover the side portions of the worked surface band 110 that are not covered by the first layer 120 so that the metal in such side areas is protected against corrosion. The second layer 222 may extend partly onto unworked surface portions of the metal as well in order to assure such coverage. The second layer also acts against any tendency of the first layer 120 to delaminate/delayer from the pipe. In the illustrated embodiment the second layer 122 does not extend beyond the edges 112 and 114 of the worked surface band 110, but in other embodiments the second layer could, at least in some places, extend beyond such edges for the reason stated above. As shown, the resulting elastomeric coating band covers the corrugation crest 106 and the corrugation valley 108 located immediately adjacent the crimped lock seam 100.

As an alternative to distinct layers being spray applied at discrete times, the elastomeric coating band could be applied in a series or sequence of burst sprays as an operator manually moves a spray gun along the crimped lock seam. In such an operation the operator may apply the complete coating band to a limited length (e.g., one to three feet) of the crimped lock seam 100 and then move on to an adjacent length of the lock seam and repeat the application process.

Figure 3C:
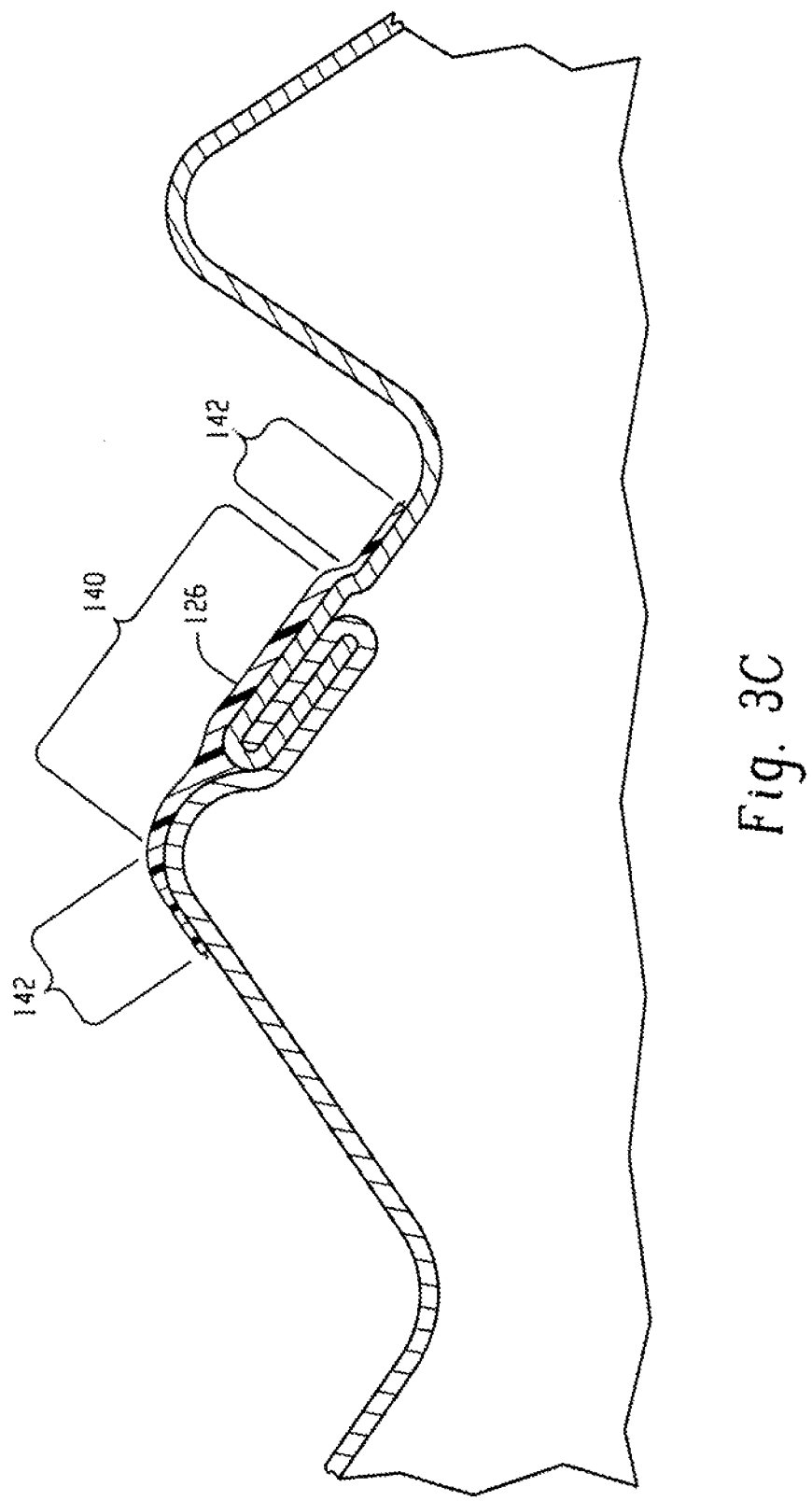
FIG. 3C shows an enlarged view of an embodiment of the band depicting a variation in thickness between an interior band segment and side band segments.

In either case, and with reference to FIG. 3C, the resulting elastomeric coating band 126 preferably has an interior band segment 140 that is bounded by side band segments 142, where the interior band segment 140 has an average thickness that is substantially greater than the average thickness of the side band segments 142 (e.g., at least twice the average thickness of the side band segments and, more preferably, between two and six times the average thickness of the side band segments (e.g., between three and five times the average thickness of the side band segments, such as about four times the average thickness of the side band segments). In one example, the average thickness of the interior band segment 140 of the elastomeric coating band is preferably at least 80 MILS (e.g., at least 100 MILS or between 80 and 120 MILS) and the average thickness of the side band segments is no more than 40 MILS (e.g., no more than 30 MILS or between 15 and 25 MILS) to provide desired sealing and overall effectiveness of the band, but variations are possible. It is also possible that in some embodiments applying the coating as only a single layer, with a fairly consistent thickness across the full width of the band, would be possible. In any case, in most implementations it is desired that the overall average thickness across the entire width of the coating band be at least about 60 MILS.

Figure 3D:
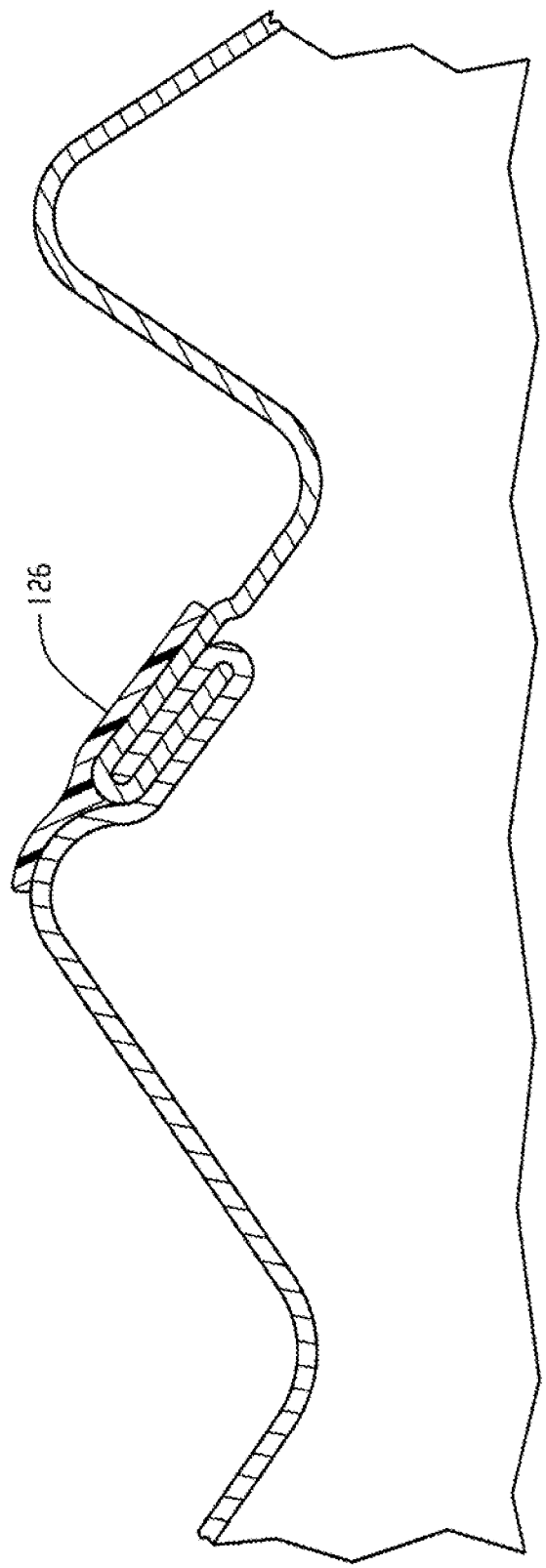
FIG. 3D shown an enlarged view of an embodiment of the band depicting a generally uniform thickness across the width of the band.

In yet another configuration as per FIG. 3D, the thickness of the coating band could be generally uniform across most of the width of the band, though it is recognized that with a spray coating process the thickness will tend to thin out a bit at locations along the side of the band. In one implementation, a 2-4" (e.g., 3") wide profiled/worked surface band may be formed (e.g., 1.5" on either side of the seam). The profiled surface is then covered with a 3-6" (e.g., 4") wide layer of the elastomeric coating band (e.g., 2" on either side of the seam) such that the sides of the coating band extend over unprofiled/unworked surface portions of the pipe. The coating may be applied via a spray process as described above, built up to the final thickness (e.g., 50 to 150 MILS) using a number of short, overlapping bursts of material spray.

Figure 4:
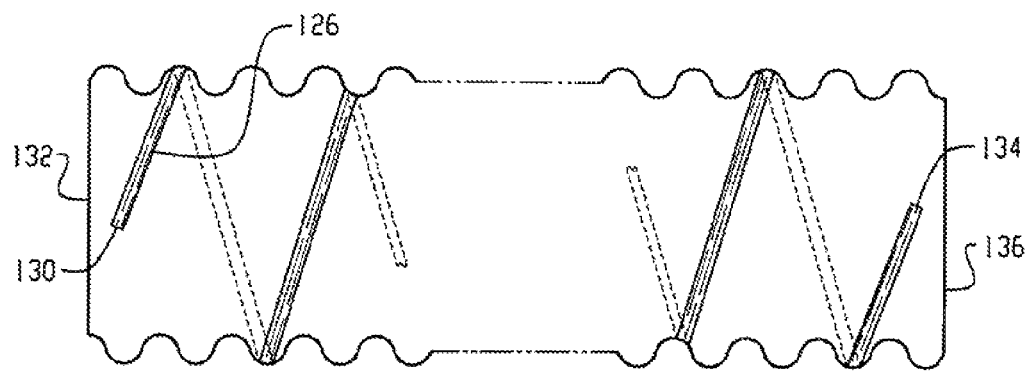
FIG. 4 shows a side elevation of a resulting pipe where the elastomeric coating is stopped short of the ends of the pipe.

In one embodiment, as shown in the schematic view of FIG. 4, the application of the elastomeric coating is stopped short of the opposite ends of the pipe. For example, where the tubular pipe is at least six feet in length, the first end 130 of the elastomeric coating band 126 is spaced from the first end 132 of the pipe by about six to 10 inches (e.g., no more than twelve inches), and the second end 134 of the elastomeric coating band is spaced from the second end 136 of the pipe by about six to 10 inches (e.g., no more than twelve inches). The purpose of stopping the coating short of the ends of the pipe is to prevent the coating from interfering with pipe to pipe connection in the field (e.g., particularly where the pipes are welded together in the field).

Figure 5:
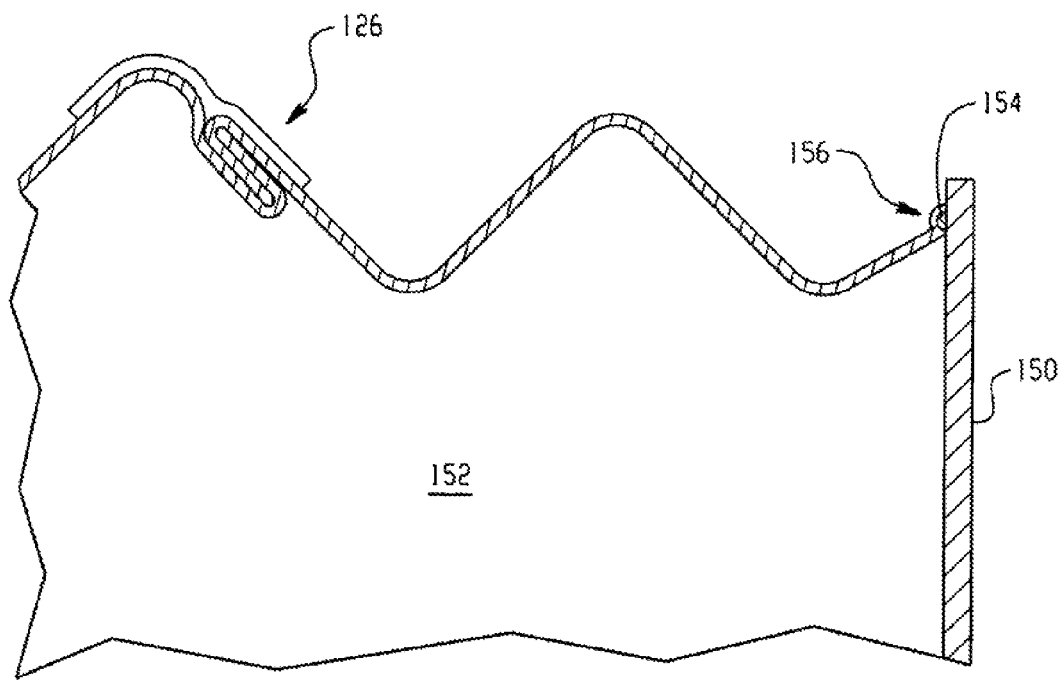
FIG. 5 shows a partial view of a tank formed of pipe with an end wall.

Referring to FIG. 5, tank structures may be formed by end walls (e.g., 150—only one shown) at the ends of the pipe to enclose a volume 152 of the tank. A weld 154 joins each end wall 140 to its respective end of the pipe. An exterior elastomeric coating 156 is applied along each end wall weld. Suitable access ports or risers may be connected along the length of the pipe and/or openings provided in the tank end walls for connection of piping, making such tanks suitable for a variety of uses. For example, the tanks could be used in rainwater harvesting systems in which the infeed pipe to the tank delivers rainwater runoff (e.g., flow from a rooftop, paved surface or otherwise).

It is to be clearly understood that the above description is intended by way of illustration and example only and is not intended to be taken by way of limitation, and that changes and modifications are possible. In particular, while an elastomeric coating in the form of a polyurea that is applied via a plural component processing technique is primarily described, other coatings could be used. For example, a single component polyurea could be used, or a single or plural component polyurethane, epoxy or other material/system that may or may not be a thermoset or thermoplastic system could be used, it being recognized that polymeric materials are generally preferred for the coating band, but are not necessarily required. Other changes and modifications are possible.

What is claimed is:

1. A pipe, comprising:
   a tubular pipe formed of a metal sheet that is spirally wound such that opposite edges of the metal sheet are joined by a crimped lock seam that extends helically along a length of the tubular pipe;
   a sealing arrangement comprising:
      a helically extending worked surface band extending along the crimped lock seam and to both sides of the crimped lock seam, the worked surface band having a surface roughness that is greater than a surface roughness of unworked surface portions outside of the worked surface band;
      a helically extending external coating band applied over the crimped lock seam and bonded to the worked surface band;
   wherein the coating band is an elastomeric material.

2. The pipe of claim 1 wherein average thickness of the coating band is at least 60 MILS.

3. The pipe of claim 2 wherein average thickness of the coating band is at least 80 MILS.

4. The pipe of claim 1 wherein the coating band includes an interior band segment that overlies the crimped lock seam and that is bounded by first and second side band segments, wherein an average thickness of the interior band segment is at least twice the average thickness of the first and second side band segments.

5. The pipe of claim 4 wherein the average thickness of the interior band segment is at least three times the average thickness of the first and second side band segments.

6. The pipe of claim 1 wherein:
   the coating is comprised of at least two layers including a first layer over the crimped lock seam and having a first width and a second layer over the first layer and having a second width, the first width less than a width of the worked surface band and the second width greater than the first width, such that the first layer is bonded to the worked surface band, a middle portion of the second layer is bonded to the first layer and side portions of the second layer are bonded, at least in part, to the worked surface band.

7. The pipe of claim 1 wherein the elastomeric material is a polyurea material applied via a single component or plural component processing technique.

8. The pipe of claim 1 wherein the coating band covers an entire width of the worked surface band and side portions of the coating band cover unworked surface portions of the metal sheet.

9. A tank structure, comprising:
   a pipe comprising:
      a tubular pipe formed of a metal sheet that is spirally wound such that opposite edges of the metal sheet are joined by a crimped lock seam that extends helically along a length of the tubular pipe;
      a sealing arrangement comprising:
         a helically extending worked surface band extending along the crimped lock seam and to both sides of the crimped lock seam, the worked surface band having a surface roughness that is greater than a surface roughness of unworked surface portions outside of the worked surface band;
         a helically extending external coating band applied over the crimped lock seam and bonded to the worked surface band;
   first and second end walls at first and second ends of the pipe to enclose a volume of the tank.

10. The tank structure of claim 9, further comprising:
    a weld joining the first end wall to the first end of the pipe;
    a second weld joining the second end wall to the second end of the pipe;
    an exterior coating along the first weld; and
    an exterior coating along the second weld.

11. A rainwater harvesting system, comprising:
    a tank according to claim 10; and
    a rainwater inlet pipe connected to deliver rainwater into the tank.

12. The pipe of claim 1 wherein:
    the metal sheet is corrugated and the tubular pipe includes helically extending corrugations;
    the crimped lock seam is located along a transition from corrugation crest to corrugation valley; and
    the worked surface band encompasses the corrugation crest and the corrugation valley immediately adjacent the crimped lock seam; and
    the coating band covers the corrugation crest and the corrugation valley immediately adjacent the crimped lock seam.

13. The pipe of claim 1 wherein the worked surface band has an average surface roughness of at least 3 MILS as measured using a surface profile gauge.

14. A pipe, comprising:
- a tubular pipe formed of a metal sheet that is spirally wound such that opposite edges of the metal sheet are joined by a crimped lock seam that extends helically along a length of the tubular pipe;
- a sealing arrangement comprising:
  - a helically extending worked surface band extending along the crimped lock seam and to both sides of the crimped lock seam, the worked surface band having a surface roughness that is greater than a surface roughness of unworked surface portions outside of the worked surface band;
- a helically extending external coating band applied over the crimped lock seam and bonded to the worked surface band;
  - a first end of the coating band is spaced from a first end of the tubular pipe and a second, opposite end of the coating band is spaced from a second end of the tubular pipe to facilitate connection of the tubular pipe to another pipe in the field.

15. The pipe of claim 14 wherein:
the tubular pipe is at least six feet in length, the first end of the coating band is spaced from the first end of the pipe by no more than twelve inches, and the second end of the coating band is spaced from the second end of the pipe by no more than twelve inches.

16. A pipe assembly, comprising:
- a first length of pipe according to claim 14;
- a second length of pipe, the second length not unitary with the first length but connected to the first length by a joint between the first end of the first length of pipe and the first end of the second length of pipe.

17. The pipe of claim 1 wherein:
- the pipe is at least six feet in length and at least thirty-six inches in diameter;
- a width of the worked surface band is measured perpendicular to a helix angle of the worked surface band, the width of the worked surface band is between about two inches and about ten inches;
- a width of the coating band is measured perpendicular to the helix angle and is between about three inches and about twelve inches.

18. A method of manufacturing a pipe, comprising:
- spiraling an elongated metal sheet strip material into a helical form so that opposite edges of the strip come together to create a tubular pipe form;
- crimping the opposite edged of the strip to form a helical lock seam that extends along the tubular pipe form;
- working an external surface of the tubular pipe form along the helical lock seam and to the sides of the helical lock seam to form a helically extending worked surface band having a surface roughness that is greater than a surface roughness of unworked surface portions outside of the worked surface band;
- applying an external coating material over the helical lock seam and bonded to the worked surface band to form a helically extending coating material band for sealing the helical lock seam;
- wherein the working step is performed by one of:
  - automated machinery located at the output side of a forming mill that performs the spiraling and crimping steps, or
  - manual application of a machining tool after the tubular pipe form has been cut to length.

19. The method of claim 18 wherein average thickness of the coating material band is at least 80 MILS.

20. The method of claim 18 wherein:
the applying step involves applying the coating material such that the resulting coating material band includes an interior band segment that overlies the crimped lock seam and completely covers the worked surface band, the interior band segment bounded by first and second side portions that cover unworked surface portions outside the worked surface band.

21. The method of claim 18 wherein:
- the metal sheet is corrugated and the tubular pipe form includes helically extending corrugations;
- the helical lock seam is located along a transition from corrugation crest to corrugation valley; and
- the working step involves working an area to the sides of the helical lock seam that encompasses the corrugation crest and the corrugation valley immediately adjacent the helical lock seam; and
- the applying step involves applying the coating material such that it covers the corrugation crest and the corrugation valley immediately adjacent the helical lock seam.

22. The method of claim 18, further comprising:
after the working step and before the applying step, testing the worked surface band to verify whether the worked surface band has an average surface roughness of at least 4 MILS as measured using a surface profile gauge, and:
- if the worked surface band does not have an average surface roughness of at least 4 MILS, performing a secondary working step;
- if the worked surface band does have an average surface roughness of at least 4 MILS, no secondary working step is performed.

23. The method of claim 18 wherein:
- the applied coating material is a polymeric material;
- the tubular pipe form is at least six feet in length and at least thirty-six inches in diameter;
- a width of the worked surface band is measured perpendicular to a helix angle of the worked surface band, the width of the worked surface band is between about two inches and about ten inches;
- a width of the coating material band is measured perpendicular to the helix angle and is between about three inches and about twelve inches.

\* \* \* \* \*